(12) United States Patent
Ghosh

(10) Patent No.: US 9,552,578 B2
(45) Date of Patent: Jan. 24, 2017

(54) METHOD AND SYSTEM FOR AUTHENTICATION OF PAYMENT CARD TRANSACTIONS

(71) Applicant: MASTERCARD INTERNATIONAL INCORPORATED, Purchase, NY (US)

(72) Inventor: Debashis Ghosh, Charlotte, NC (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/631,402

(22) Filed: Feb. 25, 2015

(65) Prior Publication Data
US 2016/0247143 A1   Aug. 25, 2016

(51) Int. Cl.
*G06Q 20/32* (2012.01)
*G06Q 20/40* (2012.01)
*H04B 5/00* (2006.01)

(52) U.S. Cl.
CPC ...... *G06Q 20/3278* (2013.01); *G06Q 20/3226* (2013.01); *G06Q 20/4016* (2013.01); *H04B 5/0031* (2013.01)

(58) Field of Classification Search
CPC ............ G06Q 20/3278; G06Q 20/4016; G06Q 20/3226; G07B 15/00; H04B 5/0031
See application file for complete search history.

(56) References Cited

U.S. PATENT DOCUMENTS

| | | | |
|---|---|---|---|
| 2011/0136429 A1* | 6/2011 | Ames | H04B 5/02 455/41.1 |
| 2012/0215594 A1* | 8/2012 | Gravelle | G07B 15/063 705/13 |
| 2014/0309885 A1 | 10/2014 | Ricci | |
| 2014/0310075 A1 | 10/2014 | Ricci | |
| 2014/0310103 A1 | 10/2014 | Ricci | |
| 2014/0310610 A1 | 10/2014 | Ricci | |

* cited by examiner

*Primary Examiner* — Kristy A Haupt
(74) *Attorney, Agent, or Firm* — Ohlandt, Greeley, Ruggiero & Perle, L.L.P.

(57) ABSTRACT

A method and a system are provided for authenticating secure payment card transactions and verifying and validating payment card user identities. The method includes determining a numeric or alphanumeric code on a vehicle registration plate of a vehicle (e.g., a driverless vehicle or a drone) bearing a processing device that is approaching a payment area (e.g., a toll road, a refueling station, or a retail store). A wireless communication circuit (e.g., Near Field Communication (NFC) circuit) is communicatively coupled to the processing device. The method also includes determining a numeric or alphanumeric identification of the processing device; comparing the numeric or alphanumeric code on the vehicle registration plate with the numeric or alphanumeric identification of the processing device to determine whether or not an association exists between the vehicle and the processing device; and assessing the determined association to facilitate determining whether a payment transaction using the processing device is valid or invalid (e.g., potential fraud).

18 Claims, 5 Drawing Sheets

METHOD AND SYSTEM FOR AUTHENTICATION OF PAYMENT CARD TRANSACTIONS

BACKGROUND OF THE DISCLOSURE

1. Field of the Disclosure

The present disclosure relates to systems and methods directed to authentication of payment card transactions. More particularly, the present disclosure relates to systems and methods directed to authentication, verification and validation of payment card user activity as well as for payment card user identity by assessing whether or not an association exists between a user vehicle (e.g., a driverless vehicle or a drone) entering a payment area (e.g., a toll road, a refueling station, or a retail store) and a processing device (e.g., a mobile device such as a cell phone or smart phone) to facilitate determining whether a payment transaction using the processing device is valid or invalid.

2. Description of the Related Art

Payment card companies and merchants incur billions of dollars in losses each year from payment card fraud. Fraud is particularly high in the world of ecommerce where no payment card is actually presented for verification and the actual identity of the user performing the transaction is very difficult, if not impossible, to verify.

Some current fraud mitigation techniques include, for example, merchants requesting a payment card holder's zip code and payment card verification value (CVV) information to verify the identity of the payment card holder. Unfortunately, in a majority of the instances in which the payment card or the payment card number gets compromised, this information also gets compromised, thus reducing the efficacy of these additional pieces of information.

Another technique is for payment card companies to build detailed expensive models on payment card holder behaviors around purchase patterns (things they buy, stores they frequent, etc.) and geolocation movements (places the payment card holder typically travels to). These behaviors are compiled over time and continually evolve. The purchase models are used to detect fraud early and alert merchants and payment card holders. However, the models take months, if not years, to be built for each user and often result in false positives when a user breaks their pattern.

There exists a myriad of current methods that provide for authentication, verification and validation of user activity as well as for user identity. These technologies are used to ensure that an individual is the actual person claimed for the benefit of the activity or transaction. Today, many employed technologies have greatly reduced fraudulent transactions, however instances of fraudulent activity still occur. These technologies are employed, for example, when an individual engages in some transaction that requires some degree of security. An automated financial transaction is a common example of a secure transaction requiring mechanisms to authenticate, verify and validate the identity of the individual attempting to perform the transactional activity. Primary examples of such transactions include performing some banking function, using payment cards (e.g., credit or debit cards) at a point of sale (POS) to make a purchase, that require some form of authentication, verification and validation.

Typical means that are used to authenticate individuals attempting a secure transaction include use of personal identification numbers (PINS) or some other type of information that is assumed to be known only by an authorized user involved in the transaction. Other means of documentation may also be used to verify identity, such as a driver's license or other form of photo identification. Even the use of biometric devices, such as fingerprint scanners, may be used to authenticate an individual attempting to perform a secure transaction. However, even with these and many other technologies employed, fraudulent activity still occurs, and identity theft and misrepresentation remains a problem.

As indicated above, many existing fraud detection and prevention technologies can and do provide a false positive indication of fraudulent activity. Besides the fraud detection and prevention mechanisms already mentioned, other technologies may be employed such as behavioral profiling that is used to detect anomalous behavior. These technologies employ intelligent algorithms to analyze past user behavior when a user attempts to engage in some activity or transaction that is similar to a previous activity or transaction. If the individual's behavior when engaging in a secure activity is not consistent with that individual's past behavior, a likelihood of fraudulent activity may be deduced.

Common examples of this situation are when an individual uses a payment card to purchase some product or service in a foreign country where they have never previously performed a similar transaction. Or, the amount of a particular transaction is significantly different from any previous transaction. This behavior may appear anomalous to a fraud detection system and the activity or transaction being performed may be terminated before any potential fraud is perpetrated. If this is in fact a false positive indication and the individual is actually an authorized user, the user suffers the consequences of a failed transaction and the service provider is perceived to have provided a poor quality of service.

Also, payment cards can be stolen and/or PINS can become compromised and information meant to be held only by authorized users can become known to others. The reality is that other means to perform authentication, verification and validation of authorized users to assist in an authentication process continues to have relevance for transactions where fraudulent activity remains a problem.

With the commercialization of driverless cars, new methods will need to be developed that will provide for authentication, verification and validation of user activity as well as for user identity. Recent legislation has made Nevada the first state where autonomous vehicles can be legally operated on public roads.

For example, driverless cars may include a bunk bed style in which the passengers can sleep horizontally. Passengers can sleep in their driverless cars in the night and wake up at their destination in the morning. In such travel, there is a need for a passive way of making payments for toll charges, refueling, parking, and the like. It would be desirable to have a method that could make the payments without waking the passengers. And with the development of a passive way of making payments, there must also be developed a method for authentication, verification and validation of payment activity as well as for passenger identity.

Thus, there is a need for additional and improved systems and methods to assist, for example, with fraud management systems and identity recognition and authentication. These systems are employed in a variety of industries, including banking and finance, commerce, security and others. In many cases, existing technologies employ detection methods as opposed to prevention methods. That is, many technologies and systems currently in place attempt to detect some fraudulent activity after it has occurred, and then prevent similar fraudulent activity in the future based on this detection. These methods are not optimal as fraudulent activity can be successful in at least one instance prior to detection and subsequent prevention. The prevention of the fraudulent activity at the first attempt to do so, is certainly preferable, as well as reducing incidences of false positive indications of fraud. No present fraud detection and prevention system is perfect. Thus, there is always a need to employ additional technologies to further reduce fraud and identity theft, thereby reducing the economic impact of such undesired activity, especially with the commercialization of new technologies such as driverless cars.

SUMMARY OF THE DISCLOSURE

The present disclosure provides systems and methods directed to authentication of payment card transactions. More particularly, the present disclosure relates to systems and methods directed to authentication, verification and validation of payment card user activity as well as for payment card user identity by assessing whether or not an association exists between a user vehicle (e.g., a driverless vehicle or a drone) entering a payment area (e.g., a toll road, a rest stop service area, a refueling station, a parking area, a park, or a retail store) and a processing device (e.g., a mobile device such as a cell phone or smart phone) to facilitate determining whether a payment transaction using the processing device is valid or invalid.

The present disclosure also provides a method that includes determining a numeric or alphanumeric code on a vehicle registration plate of a vehicle (e.g., a driverless vehicle or a drone) bearing a processing device (e.g., a mobile device such as a cell phone or smart phone) that is approaching a payment area (e.g., a toll road, a rest stop service area, a refueling station, a parking area, a park, or a retail store). A wireless communication circuit (e.g., Near Field Communication (NFC) circuit) is communicatively coupled to the processing device, the wireless communication circuit including at least one of a wireless communication tag and a wireless communication reader to receive or selectively provide wireless connectivity data from or to the payment area via a wireless communication link. The method also includes determining a numeric or alphanumeric identification of the processing device; comparing the numeric or alphanumeric code on the vehicle registration plate with the numeric or alphanumeric identification of the processing device to determine whether or not an association exists between the vehicle and the processing device; and assessing the determined association to facilitate determining whether a payment transaction using the processing device is valid or invalid.

The present disclosure further provides method for authentication of a payment card transaction. The method includes receiving information from a processing device involving a payment card holder initiating a payment card transaction at a payment area (e.g., a toll road, a rest stop service area, a refueling station, a parking area, a park, or a retail store). A wireless communication circuit (e.g., Near Field Communication (NFC) circuit) is communicatively coupled to the processing device, the wireless communication circuit including at least one of a wireless communication tag and a wireless communication reader to receive or selectively provide wireless connectivity data from or to the payment area via a wireless communication link. The method also includes determining a numeric or alphanumeric code on a vehicle registration plate of a vehicle (e.g., a driverless vehicle or a drone) containing the processing device that is approaching the payment area; determining a numeric or alphanumeric identification of the processing device; comparing the numeric or alphanumeric code on the vehicle registration plate with the numeric or alphanumeric identification of the processing device to determine whether or not an association exists between the vehicle and the processing device; and assessing the determined association to facilitate determining whether a payment transaction using the processing device is valid or invalid.

The present disclosure still further provides a system that includes a computer storage storing information comprising a payment area (e.g., a toll road, a rest stop service area, a refueling station, a parking area, a park, or a retail store), one or more vehicles (e.g., one or more driverless vehicles or drones) associated with a wireless communication device, and one or more wireless communication devices associated with one or more payment card holders; and a processor coupled to the computer storage. The processor is operable to: receive information from the wireless communication device involving a payment card holder initiating a payment card transaction at the payment area; wherein a wireless communication circuit (e.g., Near Field Communication (NFC) circuit) is communicatively coupled to the wireless communication device, the wireless communication circuit including at least one of a wireless communication tag and a wireless communication reader to receive or selectively provide wireless connectivity data from or to the payment area via a wireless communication link; determine a numeric or alphanumeric code on a vehicle registration plate of a vehicle containing the wireless communication device that is approaching the payment area; determine a numeric or alphanumeric identification of the wireless communication device; compare the numeric or alphanumeric code on the vehicle registration plate with the numeric or alphanumeric identification of the wireless communication device to determine whether or not an association exists between the vehicle and the wireless communication device; and assess the determined association to facilitate determining whether a payment transaction using the wireless communication device is valid or invalid.

The present disclosure also provides a non-transitory machine-readable medium comprising a plurality of machine-readable instructions which when executed by one or more processors of a server are adapted to cause the server to perform a method. The method includes determining a numeric or alphanumeric code on a vehicle registration plate of a vehicle (e.g., a driverless vehicle or a drone) containing a processing device that is approaching a payment area (e.g., a toll road, a rest stop service area, a refueling station, a parking area, a park, or a retail store). A wireless communication circuit (e.g., Near Field Communication (NFC) circuit) is communicatively coupled to the processing device, the wireless communication circuit including at least one of a wireless communication tag and a wireless communication reader to receive or selectively provide wireless connectivity data from or to the payment area via a wireless communication link. The method also includes determining a numeric or alphanumeric identification of the processing device; comparing the numeric or alphanumeric code on the vehicle registration plate with the numeric or alphanumeric identification of the processing device to determine whether or not an association exists between the vehicle and the processing device; and assessing the determined association to facilitate determining whether a payment transaction using the processing device is valid or invalid.

These and other features and advantages of the present disclosure will be more readily apparent from the detailed description of the embodiments set forth herein.

BRIEF DESCRIPTION OF THE DRAWINGS

A component or a feature that is common to more than one drawing is indicated with the same reference number in each drawing.

DESCRIPTION OF THE EMBODIMENTS

Figure 1:
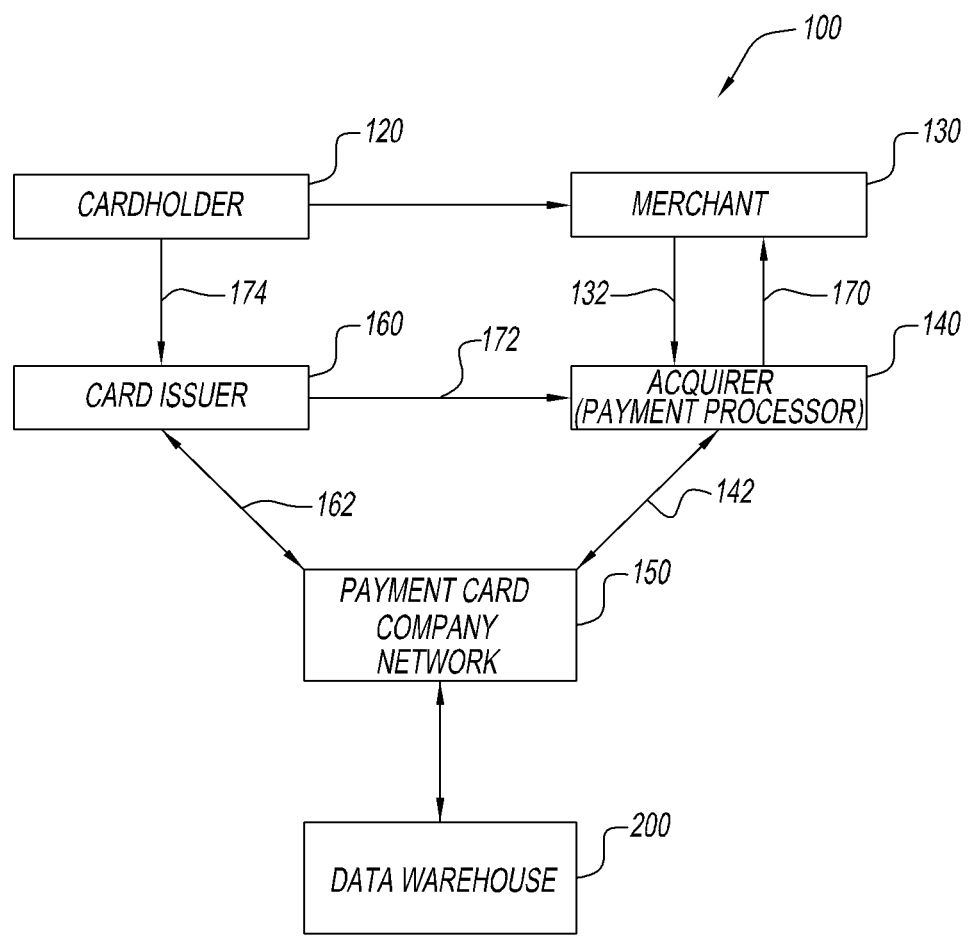
FIG. 1 is a diagram of a four party payment card system.

Embodiments of the present disclosure are described more fully hereinafter with reference to the accompanying drawings, in which some, but not all, embodiments of this disclosure are shown. Indeed, this disclosure can be embodied in many different forms and should not be construed as limited to the embodiments set forth herein. Rather, these embodiments are provided so that this disclosure clearly satisfies applicable legal requirements. Like numbers refer to like elements throughout.

As used herein, entities can include one or more persons, organizations, businesses, institutions and/or other entities, such as financial institutions, services providers, and the like that implement one or more portions of one or more of the embodiments described and/or contemplated herein. In particular, entities can include a person, business, school, club, fraternity or sorority, an organization having members in a particular trade or profession, sales representative for particular products, charity, not-for-profit organization, labor union, local government, government agency, or political party.

As used herein, vehicle can include any mobile machine, in particular, any mobile machine that transports people or cargo. Illustrative vehicles include, for example, automobiles (both driver automobiles and driverless automobiles), drones or unmanned aerial vehicles (UAVs), and the like. Processing devices are integrated into the vehicles for carrying out the method of this disclosure.

In one embodiment, the method of this disclosure includes a driverless automobile bearing a processing device such as a cell phone or smart phone. In another embodiment, the method of this disclosure includes a drone or UAV in which the processing device can be an extension of the mobile device that controls it. With a drone or UAV, mobile authentication can be implicit, much like the combination of the driverless automobile and the processing device.

As used herein, vehicle registration plate can include any plate, marker, designation or the like, that is used for identification of a vehicle.

Where applicable, the steps and/or actions of a method described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some embodiments, the processor and the storage medium can reside in an Application Specific Integrated Circuit (ASIC). In the alternative, the processor and the storage medium can reside as discrete components in a computing device. Additionally, in some embodiments, the events and/or actions of a method can reside as one or any combination or set of codes and/or instructions on a machine-readable medium and/or computer-readable medium, which can be incorporated into a computer program product.

In one or more embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc" as used herein, include compact disc (CD), laser disc, optical disc, digital versatile disc (DVD), floppy disk and blu-ray disc where disks usually reproduce data magnetically, while discs usually reproduce data optically with lasers. Combinations of the above are included within the scope of computer-readable media.

Computer program code for carrying out operations of embodiments of the present disclosure can be written in an object oriented, scripted or unscripted programming language such as Java, Perl, Smalltalk, C++, or the like. However, the computer program code for carrying out operations of embodiments of the present disclosure can also be written in conventional procedural programming languages, such as the "C" programming language or similar programming languages.

Embodiments of the present disclosure are described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer readable memory produce an article of manufacture including instruction means that implement the function/act specified in the flowchart and/or block diagram block(s).

The computer program instructions can also be loaded onto a computer or other programmable data processing apparatus to cause a series of operational steps to be performed on the computer or other programmable apparatus to produce a computer-implemented process so that the instructions that execute on the computer or other programmable apparatus provide steps for implementing the functions/acts specified in the flowchart and/or block diagram block(s). Alternatively, computer program implemented steps or acts can be combined with operator or human implemented steps or acts in order to carry out an embodiment of the present disclosure.

Referring to the drawings and, in particular, FIG. 1, there is shown a four party payment (credit, debit or other) card system generally represented by reference numeral 100. In card system 100, card holder 120 submits the payment card to the merchant 130. The merchant's point of sale (POS) device communicates 132 with his acquiring bank or acquirer 140, which acts as a payment processor. The acquirer 140 initiates, at 142, the transaction on the payment card company network 150. The payment card company network 150 (that includes a financial transaction processing company) routes, via 162, the transaction to the issuing bank or card issuer 160, which is identified using information in the transaction message. The card issuer 160 approves or denies an authorization request, and then routes, via the payment card company network 150, an authorization response back to the acquirer 140. The acquirer 140 sends approval to the POS device of the merchant 130. Thereafter, seconds later, if the transaction is approved, the card holder completes the purchase and receives a receipt.

The account of the merchant 130 is credited, via 170, by the acquirer 140. The card issuer 160 pays, via 172, the acquirer 140. Eventually, the card holder 120 pays, via 174, the card issuer 160.

Data warehouse 200 is a database used by payment card company network 150 for reporting and data analysis. According to one embodiment, data warehouse 200 is a central repository of data that is created by storing certain transaction data from transactions occurring within four party payment card system 100. According to another embodiment, data warehouse 200 stores, for example, the date, time, amount, location, merchant code, merchant category and merchant geolocation for every transaction occurring within payment card network 150. In addition to payment card transaction information and merchant information, data warehouse 200 can also store external information such as payment card holder vehicle information (e.g., a numeric or alphanumeric code on a vehicle registration plate of a vehicle) and payment card holder processing device information (e.g., a numeric or alphanumeric identification of the mobile device). External information can also include geographic and demographic information (e.g., gender and age).

In yet another embodiment, data warehouse 200 stores, reviews, and/or analyzes information used in (i) determining a numeric or alphanumeric code on a vehicle registration plate of a vehicle containing the processing device that is approaching a payment area, (ii) determining a numeric or alphanumeric identification of the processing device, (iii) comparing the numeric or alphanumeric code on the vehicle registration plate with the numeric or alphanumeric identification of the processing device to determine whether or not an association exists between the vehicle and the processing device, and (iv) assessing the determined association to facilitate determining whether a payment transaction using the processing device is valid or invalid (e.g., potential fraud).

In another embodiment, data warehouse 200 stores, reviews, and/or analyzes information used in developing logic for (i) determining a numeric or alphanumeric code on a vehicle registration plate of a vehicle containing the processing device that is approaching a payment area, (ii) determining a numeric or alphanumeric identification of the processing device, (iii) comparing the numeric or alphanumeric code on the vehicle registration plate with the numeric or alphanumeric identification of the processing device to determine whether or not an association exists between the vehicle and the processing device, and (iv) assessing the determined association to facilitate determining whether a payment transaction using the processing device is valid or invalid (e.g., potential fraud).

In another embodiment, data warehouse 200 aggregates the information by payment card holder, vehicle, processing device, merchant, category and/or location. In still another embodiment, data warehouse 200 integrates data from one or more disparate sources. Data warehouse 200 stores current as well as historical data and is used for creating reports, performing analyses on the network, merchant analyses, and performing predictive analyses.

Figure 2:
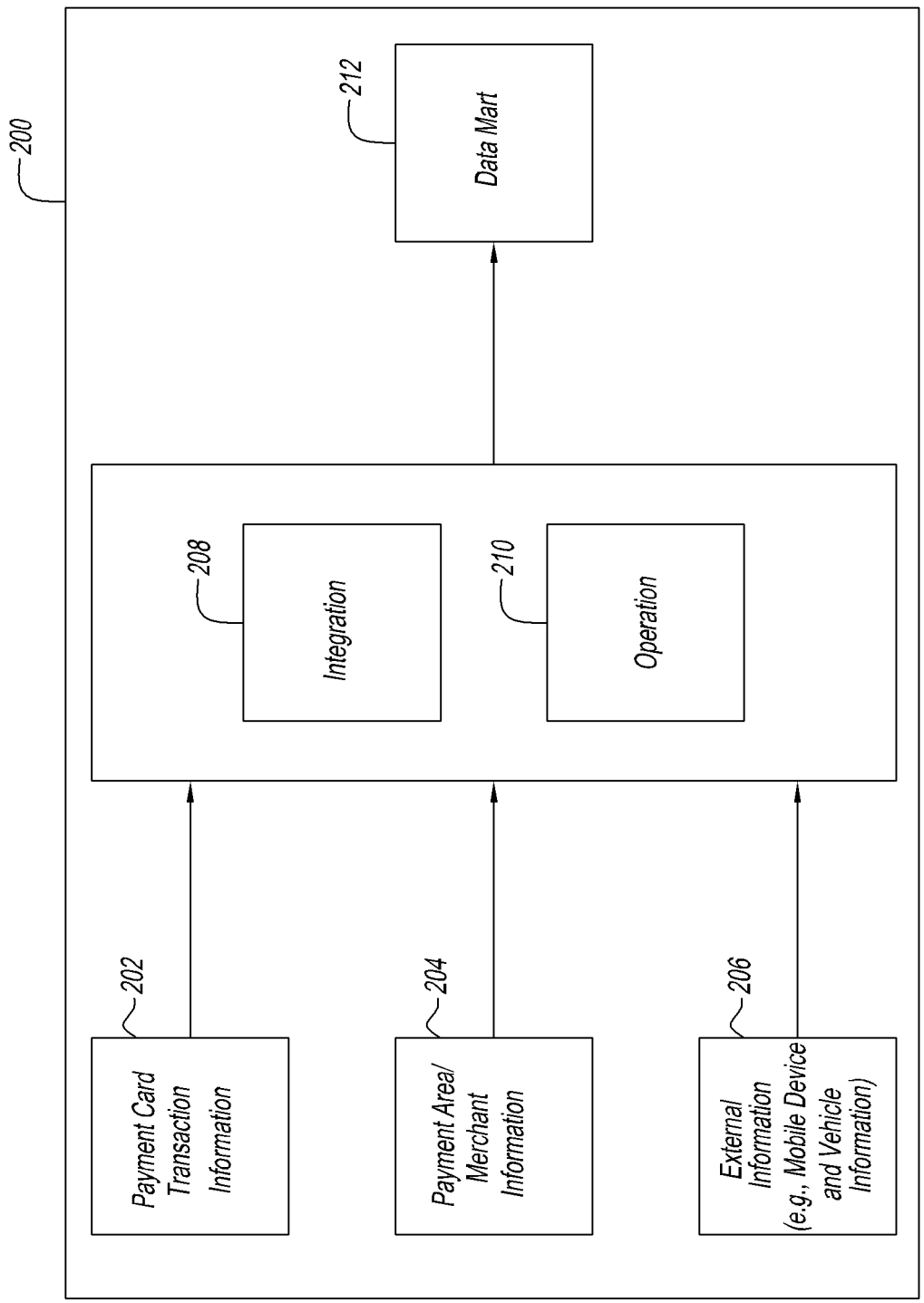
FIG. 2 illustrates a data warehouse shown in FIG. 1 that is a central repository of data that is created by storing certain transaction data from transactions occurring in four party payment card system of FIG. 1.

Referring to FIG. 2, an exemplary data warehouse 200 (the same data warehouse 200 in FIG. 1) for reporting and data analysis, including the storing, reviewing, and/or analyzing of information, for the various purposes described above is shown. The data warehouse 200 can have a plurality of entries (e.g., entries 202, 204 and 206).

The payment card transaction information 202 can include, for example, payment card holder information, and purchasing and payment activities attributable to payment card holders, that can be aggregated by payment card holder, vehicle, processing device, merchant, category and/or location in the data warehouse 200. The payment card transaction information 202 can also include, for example, a transaction identifier, geolocation of payment card transaction, geolocation date on which payment card transaction occurred, geolocation time on which payment card transaction occurred, payment card number, vehicle identification number, mobile phone number, and the like.

The payment area/merchant information 204 can include, for example, a merchant name or identifier, geolocation of merchant, merchant category, and the like. The payment area can include, for example, a toll road, a rest stop service area, a refueling station, a parking area, a park, or the like.

The external information 206 includes, for example, payment card holder vehicle information (e.g., a numeric or alphanumeric code on a vehicle registration plate of a vehicle) and payment card holder processing device information (e.g., a numeric or alphanumeric identification of the mobile device). The external information 206 can include geographic data and demographic data. The external information 206 can also include other suitable information that can be useful in assisting with fraud management systems and identity recognition and authentication.

The typical data warehouse uses staging, data integration, and access layers to house its key functions. The staging layer or staging database stores raw data extracted from each of the disparate source data systems. The integration layer integrates at 208 the disparate data sets by transforming the data from the staging layer often storing this transformed data in an operational data store database 210. For example, the payment card transaction information 202 can be aggregated by processing device, vehicle, merchant, category and/or location at 208. Payment card holder information can be aggregated by payment card holder vehicle information (e.g., a numeric or alphanumeric code on a vehicle registration plate of a vehicle) and payment card holder processing device information (e.g., a numeric or alphanumeric identification of the mobile device) at 208. Also, the reporting and data analysis, including the storing, reviewing, and/or analyzing of information, for the various purposes described above, can occur in data warehouse 200. The integrated data is then moved to yet another database, often called the data warehouse database or data mart 212, where the data is arranged into hierarchical groups often called dimensions and into facts and aggregate facts. The access layer helps users retrieve data.

A data warehouse constructed from an integrated data source systems does not require staging databases or operational data store databases. The integrated data source systems can be considered to be a part of a distributed operational data store layer. Data federation methods or data virtualization methods can be used to access the distributed integrated source data systems to consolidate and aggregate data directly into the data warehouse database tables. The integrated source data systems and the data warehouse are all integrated since there is no transformation of dimensional or reference data. This integrated data warehouse architecture supports the drill down from the aggregate data of the data warehouse to the transactional data of the integrated source data systems.

The data mart 212 is a small data warehouse focused on a specific area of interest. For example, the data mart 212 can be focused on one or more of reporting and data analysis, including the storing, reviewing, and/or analyzing of information, for any of the various purposes described above. Data warehouses can be subdivided into data marts for improved performance and ease of use within that area. Alternatively, an organization can create one or more data marts as first steps towards a larger and more complex enterprise data warehouse.

This definition of the data warehouse focuses on data storage. The main source of the data is cleaned, transformed, cataloged and made available for use by managers and other business professionals for data mining, analytical processing, market research and decision support. However, the means to retrieve and analyze data, to extract, transform and load data, and to manage the data dictionary are also considered essential components of a data warehousing system. Many references to data warehousing use this broader context. Thus, an expanded definition for data warehousing includes business intelligence tools, tools to extract, transform and load data into the repository, and tools to manage and retrieve metadata.

Algorithms can be employed to determine formulaic descriptions of the integration of the data source information using any of a variety of known mathematical techniques. These formulas, in turn, can be used to derive or generate one or more analyses and updates for analyzing, creating, comparing and identifying activities using any of a variety of available trend analysis algorithms. For example, these formulas can be used in the reporting and data analysis, including the storing, reviewing, and/or analyzing of information, for the various purposes described above.

Figure 3:
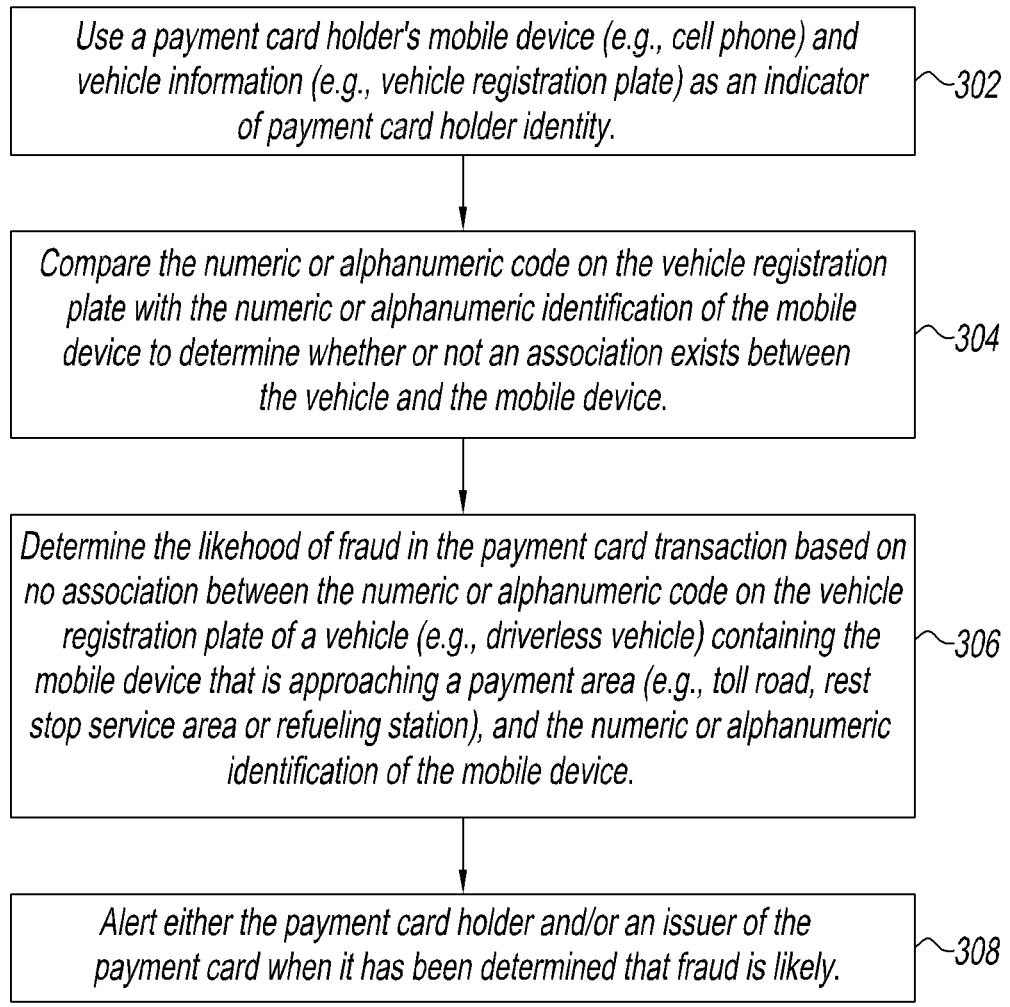
FIG. 3 is a flow diagram illustrating one environment of a process for payment card fraud alerting in accordance with an exemplary embodiment of this disclosure.

FIG. 3 illustrates one exemplary environment of a process for payment card fraud alerting. The exemplary embodiment recognizes that the association between the numeric or alphanumeric code on the vehicle registration plate and the numeric or alphanumeric identification of the processing device is a critical piece of information that can alleviate significant amounts of fraud. With the widespread adoption of processing devices, such as a cell phone and more importantly smart phones, the exemplary embodiment uses a payment card holder's cell phone and vehicle license plate at 302 as an indicator of payment card holder identity.

An association between the numeric or alphanumeric code on the vehicle registration plate and the numeric or alphanumeric identification of the processing device can be determined, in one embodiment, after a payment provider, such as a payment card company like MasterCard®, Visa®, American Express®, and the like (part of the payment card company network 150 in FIG. 1), receives a payment request from a transaction device (e.g., payment area server). The payment request can be from a payment area device, where the payment request includes information about the transaction, the payment area location, the physical address of the payment area, an amount of the transaction, and the like.

In response to receiving information regarding the payment request or payment card transaction of the payment card holder, the exemplary embodiment compares at 304 the numeric or alphanumeric code on the vehicle registration plate with the numeric or alphanumeric identification of the processing device to determine whether or not an association exists between the vehicle and the processing device.

A likelihood of fraud in the payment card transaction is then determined at 306 based on no association between the numeric or alphanumeric code on the vehicle registration plate and the numeric or alphanumeric identification of the processing device. This can vary, depending on system fraud requirements, payment card holder settings, and the like.

In a comparison of the numeric or alphanumeric code on the vehicle registration plate and the numeric or alphanumeric identification of the processing device, if the comparison results in an association between the numeric or alphanumeric code on the vehicle registration plate and the numeric or alphanumeric identification of the processing device, a reasonable assertion can be made that the payment card user is authentic, or the payment card transaction being performed is valid. In contrast, if the comparison results demonstrate no association between the numeric or alphanumeric code on the vehicle registration plate and the numeric or alphanumeric identification of the processing device, a reasonable assertion can be made that the payment card user is not authentic, or the payment card transaction being performed is invalid (e.g., potential fraud).

When it has been determined that fraud is likely, one of the following: the payment card holder, the merchant/seller, and/or an issuer of the payment card, can be alerted at 308. The alert can be through a text, email, or call to the payment card holder processing device, the merchant, and/or the payment card issuer. In one embodiment, the payment card holder can be notified and given the option of authorizing the payment, such as by verifying the payment card holder through an authentication or login flow with the payment provider through the payment card holder processing device.

The present solution utilizes the real time determination of association of a numeric or alphanumeric code on the vehicle registration plate with the numeric or alphanumeric identification of the processing device used in the payment card transaction to determine the propensity for fraud in a given transaction.

Knowing the numeric or alphanumeric code on the vehicle registration plate and the numeric or alphanumeric identification of the processing device, at the time of the transaction can vastly improve decision making on the legitimacy of the transaction. If no association exists between the associated numeric or alphanumeric code on the vehicle registration plate and the numeric or alphanumeric identification of the processing device, the payment provider can assume a potential of a fraudulent payment request.

In a payment area (e.g., a toll road, a rest stop service area, a refueling station, a parking area, or a park) scenario, when a payment card holder in a vehicle (e.g., driverless vehicle) uses a processing device at a store to pay for goods/services, the numeric or alphanumeric code on the vehicle registration plate and the numeric or alphanumeric identification of the processing device is sent the bank/financial institution/payment provider and onto a server in the fraud alerting system where the numeric or alphanumeric code on the vehicle registration plate and the numeric or alphanumeric identification of the processing device are compared in real-time. If no association exists between the associated numeric or alphanumeric code on the vehicle registration plate and the numeric or alphanumeric identification of the processing device, an alert can be generated and sent to the processing phone and/or the transaction can be pushed into a review queue or rejected.

Figure 4:
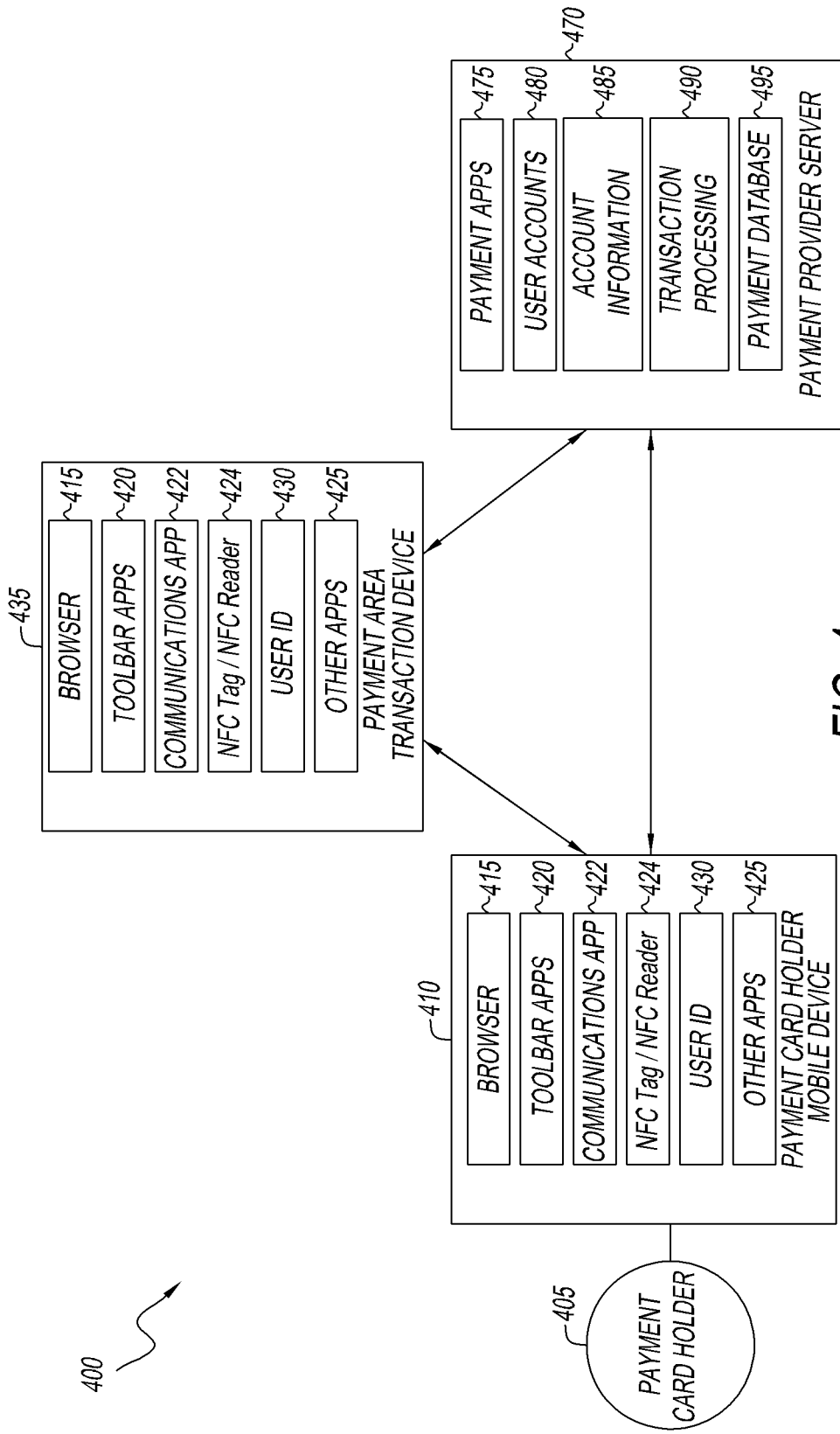
FIG. 4 is a block diagram of a system suitable for implementing the processes described herein according to an embodiment of this disclosure.

Referring to FIG. 4, a system 400 is configured to process a financial transaction or payment request between a payment recipient (e.g., toll area or merchant) and a payment card holder or consumer, in accordance with an exemplary embodiment of the present disclosure. System 400 includes a processing device 410 used to make the payment card transaction, a payment area or merchant transaction device 435 (e.g., a payment area transaction device at a toll road, a rest stop service area, a refueling station, a parking area, or a park), and a payment provider server 470. Payment provider server 470 can be maintained by a payment provider, such as a payment card company like MasterCard®, Visa®, American Express®, and the like (part of the payment card company network 150 in FIG. 1), a bank, and the like. A payment card holder 405, such as a consumer, can utilize payment card holder processing device 410 and a payment area or merchant transaction device 435 to perform a payment transaction using payment provider server 470 or to convey a desire to make a payment through the payment provider so that the payment provider can process the payment request and approve or deny the request.

Payment card holder processing device 410, payment area or merchant transaction device 435, and payment provider server 470 can each include one or more processors, memories, and other appropriate components for executing instructions, such as program code and/or data stored on one or more computer readable mediums to implement the various applications, data, and steps described herein. For example, such instructions can be stored in one or more computer readable media, such as memories or data storage devices internal and/or external to various components of system 400.

Payment card holder processing device 410 (e.g., mobile device) can be implemented using any appropriate hardware and software configured for wired and/or wireless communication. For example, in one embodiment, the payment card holder processing device can be implemented as a smart phone (e.g., iPhone™ 6), personal digital assistant (PDA), laptop computer, and/or other types of computing devices capable of transmitting and/or receiving data, such as an iPad™ or Apple™ watch. The payment card holder initiates a payment card transaction at the payment area or merchant transaction device 435 using the processing device 410.

Payment card holder processing device 410 can include one or more browser applications 415. For example, in one embodiment, browser application 415 can be implemented as a web or mobile browser configured to view information available over the Internet. Payment card holder processing device 410 can also include one or more toolbar applications 420 which can be used, for example, to provide client-side processing for performing desired tasks in response to operations selected by payment card holder 405. In one embodiment, toolbar application 420 can display a user interface in connection with browser application 415.

Payment card holder processing device 410 can further include other applications 425 as may be desired in particular embodiments to provide desired features to payment card holder processing device 410. For example, other applications 425 can include security applications for implementing client-side security features, programmatic client applications for interfacing with appropriate APIs, or other types of applications. Applications 425 can also include email, texting, voice and IM applications that allow payment card holder 405 to send and receive emails, calls, and texts, as well as applications that enable the payment card holder to communicate, make payments, and change payment options through the payment provider.

Payment card holder processing device 410 includes one or more payment card holder identifiers 430 that can be implemented, for example, as operating system registry entries, cookies associated with browser application 415, identifiers associated with hardware of payment card holder processing device 410, or other appropriate identifiers, such as used for payment/user/device authentication. In one embodiment, payment card holder identifier 430 can be used by a payment service provider to associate payment card holder 405 with a particular account maintained by the payment provider as further described herein. A communications application 422, with associated interfaces, enables payment card holder processing device 410 to communicate within system 400, such as via a cell phone network. Communications application 422 can also include a GPS service or other location service that enables the location of payment card holder processing device 410 to be determined by payment provider server 470. Note that in different embodiments, payment card holder processing device 410 can be a simple cell phone with includes, at a minimum, a location determining application and may not require some of the applications and capabilities above.

Payment card holder processing device 410 includes a Near Field Communication (NFC) circuit that is communicatively coupled to the processing device 410. The NFC circuit includes at least one of a NFC tag 424 and a NFC reader 424 to receive or selectively provide wireless connectivity data from or to the payment area or merchant transaction device 435 via a NFC communication link. The processing device 410 establishes a communication link with the payment area or merchant transaction device 435 in accordance with communication configuration information received by the NFC circuit via the NFC communication link.

Transaction device 435 is a payment area or merchant terminal such as a POS. Payment area transaction device 435 is the device that transmits a payment request from the payment area to the payment provider on behalf of the payment card holder.

Payment area transaction device 435 includes a Near Field Communication (NFC) circuit that is communicatively coupled to the processing device 410. The NFC circuit includes at least one of a NFC tag and a NFC reader 424 to receive or selectively provide wireless connectivity data from or to the payment area transaction device 435 via a NFC communication link. The payment area transaction device 435 establishes a communication link with the processing device 410 in accordance with communication configuration information received by the NFC circuit via the NFC communication link.

Payment provider server 470 can be maintained, for example, by a payment card company like MasterCard®, Visa®, American Express®, and the like (part of the payment card company network 150 in FIG. 1), or bank, which can provide payment between payment card holder 405 and the operator of payment area transaction device 435. In this regard, payment provider server 470 includes one or more payment applications 475 that can be configured to interact with payment card holder processing device 410 and payment area transaction device 435, to facilitate the purchase of goods or services by payment card holder 405 through payment card holder processing device 410 or payment area transaction device 435.

Payment provider server 470 also maintains a plurality of payment card holder accounts 480, each of which can include account information 485 associated with individual payment card holders. For example, account information 485 can include private financial information of payment card holders associated with processing devices such as account numbers, passwords, device identifiers, payment card holder names, phone numbers, payment card information, bank information, or other financial information that can be used to facilitate transactions by payment processing card holder 405. Advantageously, payment application 475 can be configured to interact with payment area transaction device 435 on behalf of payment card holder 405 during a transaction with checkout application to track and manage payment requests from the payment card holder. Payment card holder accounts can also include information about one or more processing devices and vehicles associated with the payment card holder (e.g., the numeric or alphanumeric code on the vehicle registration plate and the numeric or alphanumeric identification of the processing device) and the payment card holder account, such as a processing device ID, current location of device, history of device locations, and other information about device location as described herein.

A transaction processing application 490, which can be part of payment application 475 or separate, can be configured to receive information from a payment card holder's processing device 410 and/or payment area transaction device 435 for processing and storage in a payment database 495. Transaction processing application 490 can include one or more applications to process information from payment card holder 405 for processing a payment request or one or more locations of payment card holder processing device 410 and/or payment area transaction device 435. As such, transaction processing application 490 can store details of a payment request, including merchant location and device locations to determine a possible fraud alert for the transaction. Payment application 475 can be further configured to determine the existence of and to manage accounts for payment card holder 405, as well as create new accounts if necessary.

Payment database 495 can store transaction details from completed transactions, including location of the transaction and payment card holder's processing device 410. Such information can also be stored in a third party database accessible by the payment provider and/or the merchant.

In an exemplary embodiment, when a payment transaction is triggered by the processing device 410 (e.g., cell phone) on the payment area or merchant transaction device 435 that accepts NFC payments, an authorization message sent from the payment area terminal will include the cell phone number, the vehicle registration number along with all other fields that are typically included in the authorization message (e.g., the address (street, city, ZIP) of the merchant is typically included in the authorization message).

When the authorization message reaches the payment provider, such as a payment card company like MasterCard®, Visa®, American Express®, and the like (part of the payment card company network 150 in FIG. 1), the following analysis can be conducted: determine a numeric or alphanumeric code on a vehicle registration plate of a vehicle containing the processing device that is approaching the payment area; determine a numeric or alphanumeric identification of the processing device; compare the numeric or alphanumeric code on the vehicle registration plate with the numeric or alphanumeric identification of the processing device to determine whether or not an association exists between the vehicle and the processing device; and assess the determined association to facilitate determining whether a payment transaction using the processing device is valid or invalid. If the analysis is true (association exists between the vehicle and the processing device), the authorization message is tagged with flag. The analysis flag is leveraged along with other criteria to authorize or decline the transaction.

The present disclosure provides methods and systems for payment card fraud alerting based on an association between the numeric or alphanumeric code on the payment card holder's vehicle registration plate with the numeric or alphanumeric identification of the payment card holder's processing device. Aspects of exemplary environment include using the numeric or alphanumeric code on the payment card holder's vehicle registration plate with the numeric or alphanumeric identification of the payment card holder's processing device to obtain an indication of association or relatedness, in response to receiving information regarding payment card or other transaction of the payment card holder; comparing the numeric or alphanumeric code on the payment card holder's vehicle registration plate with the numeric or alphanumeric identification of the payment card holder's processing device; determining a likelihood of fraud in the payment card transaction based on no association between the numeric or alphanumeric code on the payment card holder's vehicle registration plate and the numeric or alphanumeric identification of the payment card holder's processing device; and alerting at least one of the payment card holder and an issuer of the payment card when a likelihood of fraud has been determined.

Besides the mitigation of fraudulent activity, knowledge of the payment card transactions of one or more individuals for use in value-added applications can be useful. Knowledge of the numeric or alphanumeric code on the payment card holder's vehicle registration plate, the numeric or alphanumeric identification of the payment card holder's processing device, the location of the merchant or payment area (e.g., toll area), can provide utility regardless of whether that activity requires security. Many value-added applications can benefit from such information.

In accordance with this disclosure, the automated fraud detection and prevention systems can assign a value or range of values indicating the likelihood of fraudulent activity. These assigned values can depend on the security level required for a particular payment card transaction or activity as well as the methods used to indicate fraud.

In particular, if the comparison results demonstrate an association between the numeric or alphanumeric code on the payment card holder's vehicle registration plate with the numeric or alphanumeric identification of the payment card holder's processing device, a reasonable assertion can be made that the payment card user is authentic, or the payment card transaction being performed is valid. In contrast, if the comparison results do not show an association between the numeric or alphanumeric code on the payment card holder's vehicle registration plate with the numeric or alphanumeric identification of the payment card holder's processing device, a reasonable assertion can be made that the payment card user is not authentic, or the payment card transaction being performed is invalid (e.g., potential fraud).

Figure 5:
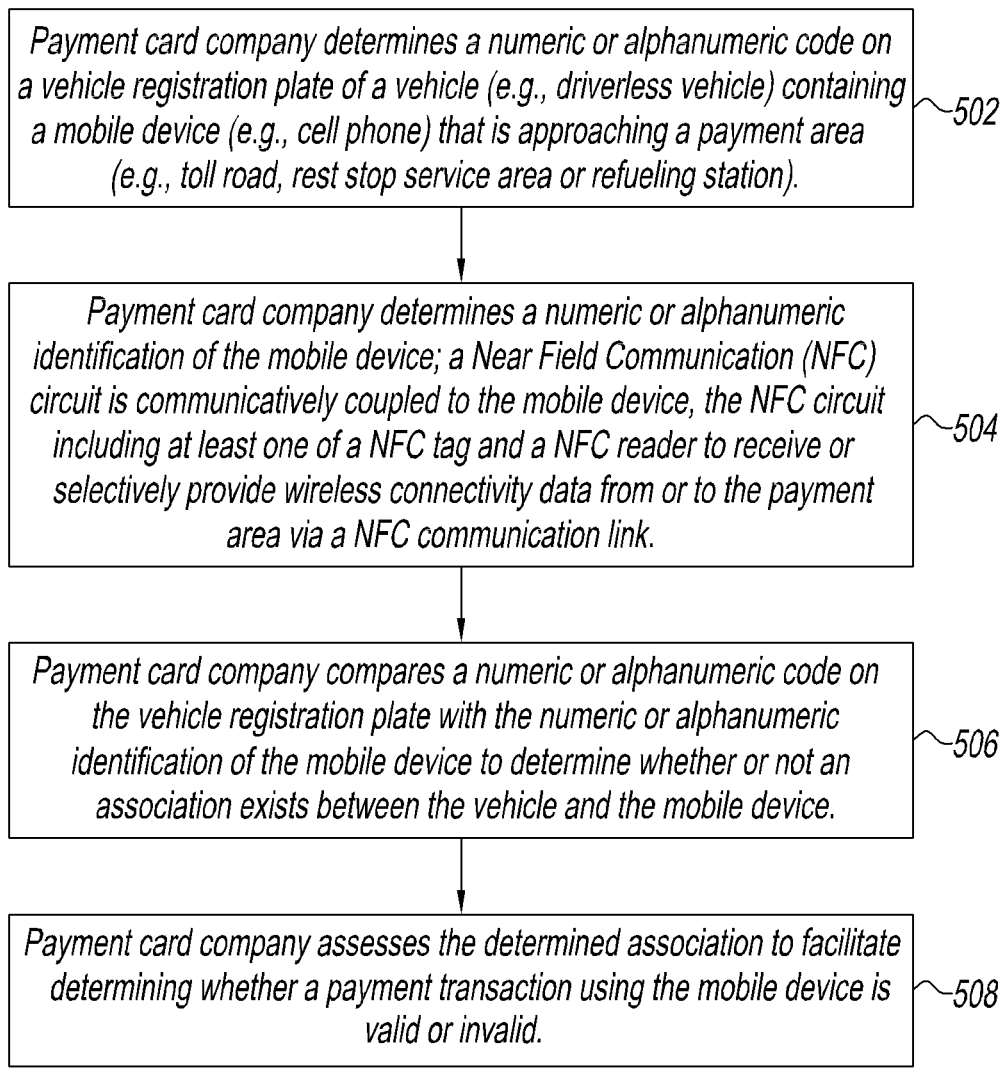
FIG. 5 is a flow diagram illustrating one environment of a process for determining whether a payment transaction using a processing device (e.g., a mobile device) is valid or invalid in accordance with an exemplary embodiment of this disclosure.

FIG. 5 illustrates an exemplary method of this disclosure. At 502, a payment card company determines a numeric or alphanumeric code on a vehicle registration plate of a vehicle containing a processing device that is approaching a payment area. A picture can be taken of the numeric or alphanumeric code on a vehicle registration plate of the vehicle and entered into a payment area server. A Near Field Communication (NFC) circuit is communicatively coupled to the processing device, the NFC circuit including at least one of a NFC tag and a NFC reader to receive or selectively provide wireless connectivity data from or to the payment area via a NFC communication link. The NFC circuit may include range boosters or range extenders to strengthen the circuit. The payment area can be, for example, a toll road, a rest stop service area, a refueling station, a parking area, a park, and the like. The processing device is, for example, a cell phone or a smart phone. The processing device establishes a communication link with the payment area server in accordance with communication configuration information received by the NFC circuit via the NFC communication link. The vehicle can be, for example, a driver vehicle or a driverless vehicle.

At 504, the payment card company determines a numeric or alphanumeric identification of the processing device.

At 506, the payment card company compares the numeric or alphanumeric code on the vehicle registration plate with the numeric or alphanumeric identification of the processing device to determine whether or not an association exists between the vehicle and the processing device. The payment card company assesses at 508 the determined association to facilitate determining whether a payment transaction using the processing device is valid or invalid. The payment transaction is, for example, a payment card transaction. The processing device includes, for example, at least one of a credit card number, a debit card number, a bank account number, and a payment account number associated with the payment area.

In an embodiment, the method of this disclosure involves retrieving information associated with the payment area; determining a payment required for the vehicle to enter the payment area or obtain services in the payment area based on the retrieved information; connecting the processing device to a server of the payment area; and sending instructions from the processing device to the server of the payment area to proceed with paying the amount required. The method can further involve receiving confirmation of payment from the payment server with the processing device.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the scope of the present disclosure. In addition, where applicable, it is contemplated that software components can be implemented as hardware components and vice-versa.

Software, in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

It will be understood that the present disclosure can be embodied in a computer readable non-transitory storage medium storing instructions of a computer program which when executed by a computer system results in performance of steps of the method described herein. Such storage media can include any of those mentioned in the description above.

Where methods described above indicate certain events occurring in certain orders, the ordering of certain events can be modified. Moreover, while a process depicted as a flowchart, block diagram, and the like can describe the operations of the system in a sequential manner, it should be understood that many of the system's operations can occur concurrently or in a different order.

The terms "comprises" or "comprising" are to be interpreted as specifying the presence of the stated features, integers, steps or components, but not precluding the presence of one or more other features, integers, steps or components or groups thereof.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it can be based on one or more other things as well. In other words, unless expressly indicated otherwise, as used herein "based on" means "based at least in part on" or "based at least partially on".

The techniques described herein are exemplary, and should not be construed as implying any particular limitation on the present disclosure. It should be understood that various alternatives, combinations and modifications could be devised by those skilled in the art from the present disclosure. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A method for validating payment card transactions, the method comprising:

storing, in a database of a payment card provider, a pairing between a numeric or alphanumeric code of a vehicle registration plate of a payment card holder and an identification of a mobile device of the payment card holder;

determining, by a payment area device, a numeric or alphanumeric code on a vehicle registration plate of a vehicle as the vehicle approaches a payment area from a picture taken of the vehicle registration plate by the payment area device;

where the payment area device is communicatively coupled to a wireless communication circuit, the wireless communication circuit including at least one of a wireless communication tag and a wireless communication reader to receive or selectively provide wireless connectivity data from or to the payment area via a wireless communication link;

determining, by the payment area device, a numeric or alphanumeric identification of the mobile device that has been received via the wireless communication link;

initiating a payment card transaction with the payment card provider by the payment area device upon receipt of a preauthorization signal from the mobile device via the wireless communication link;

comparing a pairing of the determined numeric or alphanumeric code on the vehicle registration plate and the numeric or alphanumeric identification of the mobile device with the pairing in the database to determine if the pairings match;

determining whether the payment transaction is valid or invalid based whether the comparison results in a match; and completing a payment card transaction if the transaction is determined to be valid since there is the match and denying the payment card transaction if the transaction is determined to be invalid since there is no match.

2. The method of claim 1, wherein the wireless communication circuit is a Near Field Communication (NFC) and at least one of the wireless communication tag and the wireless communication reader are an NFC tag and an NFC reader respectively.

3. The method of claim 1, further comprising:

retrieving information associated with the payment area;

determining a payment required for the vehicle to enter the payment area or obtain services in the payment area based on the retrieved information;

connecting the mobile device to a server of the payment area; and sending instructions from the processing device to the server of the payment area to proceed with paying an mount required.

4. The method of claim 3, further comprising receiving confirmation of payment from the payment area server on the mobile device.

5. The method of claim 1, wherein the payment area is at least one payment area selected from the group consisting of: a toll road, a rest stop service area, a refueling station, a parking area, and a park.

6. The method of claim 1, wherein the vehicle is a driverless automobile or a drone.

7. The method of claim 1, wherein the mobile device is a cell phone or a smart phone.

8. The method of claim 1, wherein the payment area device establishes a communication link with a payment area server in accordance with communication configuration information received by the wireless communication circuit via the wireless communication link.

9. The method of claim 1, wherein the mobile device includes at least one of a credit card number, a debit card number, a bank account number, and a payment account number associated with the payment area.

10. A system for validating payment card transaction comprising:

a mobile device of a payment card holder;

a computer storage device storing, in a database of a payment card provider, a pairing between a numeric or alphanumeric code of a vehicle registration plate of the payment card holder and an identification of the mobile device of the payment card holder;

a wireless communication circuit including at least one of a wireless communication tag and a wireless communication reader to receive or selectively provide wireless connectivity data from or to the mobile device of the payment cardholder via a wireless communication link;

a payment area device that is in communication with the wireless communication circuit and that detects a vehicle approaching a payment area, takes a picture of the vehicle registration plate, determines a numeric or alphanumeric code of the vehicle registration plate of the vehicle from the picture, determines the identification of the mobile device transmitted by the mobile device over the wireless communication circuit;

a processor coupled to the computer storage and payment area device operable to:

initiate a payment card transaction at the payment area with the payment card provider upon receipt of a preauthorization signal from the mobile device via the wireless communication link;

compare a pairing of the determined numeric or alphanumeric code on the vehicle registration plate and the mobile device identifier with the pairing in the database to determine if the pairings match; and determine whether the payment transaction is valid or invalid based on whether the comparison results in a match; and complete the payment card transaction if the transaction is determined to be valid since there is the match and denying the payment card transaction if the transaction is determined to be invalid since there is no match.

11. The system of claim 10, wherein the wireless communication circuit is a Near Field Communication (NFC) and at least one of the wireless communication tag and the wireless communication reader are a NFC tag and a NFC reader respectively.

12. The system of claim 10, wherein the payment area is at least one payment area selected from the group consisting of: a toll road, a rest stop service area, a refueling station, a parking area, and a park.

13. The system of claim 10, wherein the vehicle is a driverless automobile or a drone.

14. The system of claim 10, wherein the mobile device of the payment card holder is a cell phone or a smart phone.

15. The system of claim 10, wherein the mobile device establishes a communication link with a payment area server in accordance with communication configuration information received by the wireless communication circuit via the wireless communication link.

16. The system of claim 10, wherein the mobile device includes at least one of a credit card number, a debit card number, a bank account number, and a payment account number associated with the payment area.

17. A non-transitory machine-readable medium comprising a plurality of machine-readable instructions for validating payment card transaction which when executed by one or more processors of a server are adapted to cause the server to perform a method comprising:

storing, in a database of a payment card provider, a pairing between a numeric or alphanumeric code of a vehicle registration plate of a payment card holder and an identification of a mobile device of the payment card holder, determining, by a payment area device, a numeric or alphanumeric code on a vehicle registration plate of a vehicle as the vehicle approaches a payment area from a picture taken of the vehicle registration plate by the payment area device;

wherein the payment area device is communicatively coupled to a wireless communication circuit, the wireless communication circuit including at least one of a wireless communication tag and a wireless communication reader to receive or selectively provide wireless connectivity data from or to the payment area via a wireless communication link;

determining, by the payment area device, a numeric or alphanumeric identification of the mobile device that has been received from the mobile device via the wireless communication link;

initiating a payment card transaction with the payment card provider by the payment area device upon receipt of a preauthorization signal from the mobile device via the wireless communication link;

comparing a pairing of the determined numeric or alphanumeric code on the vehicle registration plate and the numeric or alphanumeric identification of the mobile device with the pairing in the database to determine if the pairings match;

determining whether the payment transaction is valid or invalid based whether the comparison results in a match; and completing a payment card transaction if the transaction is determined to be valid since there is the match and denying the payment card transaction if the transaction is determined to be invalid since there is no match.

18. The non-transitory machine-readable medium of claim 17, wherein the wireless communication circuit is a Near Field Communication (NFC) and at least one of the wireless communication tag and the wireless communication reader are a NFC tag and a NFC reader respectively.

* * * * *